(12) United States Patent
Spear et al.

(10) Patent No.: US 11,529,856 B2
(45) Date of Patent: Dec. 20, 2022

(54) QUICK RELEASE SYSTEM FOR A VEHICLE HARD TOP

(71) Applicants: Geof Spear, Westfield, MA (US); Johnathan Elijah Spear, Westfield, MA (US)

(72) Inventors: Geof Spear, Westfield, MA (US); Johnathan Elijah Spear, Westfield, MA (US)

( * ) Notice: Subject to any disclaimer, the term of this patent is extended or adjusted under 35 U.S.C. 154(b) by 303 days.

(21) Appl. No.: 16/439,967

(22) Filed: Jun. 13, 2019

(65) Prior Publication Data

US 2020/0198451 A1 Jun. 25, 2020

Related U.S. Application Data

(60) Provisional application No. 62/783,359, filed on Dec. 21, 2018.

(51) Int. Cl.
*B60J 7/19* (2006.01)
*E05C 1/12* (2006.01)

(52) U.S. Cl.
CPC .................. *B60J 7/194* (2013.01); *E05C 1/12* (2013.01)

(58) Field of Classification Search
CPC ........... B60J 7/194; E05C 1/12; Y10S 292/38; Y10S 292/61; E05B 2015/0451; E05B 2015/0468
USPC .................................................. 292/163, 164
See application file for complete search history.

(56) References Cited

U.S. PATENT DOCUMENTS

| 6,283,531 | B1 * | 9/2001 | Tanigawa | B60J 7/106 296/117 |
|---|---|---|---|---|
| 10,815,709 | B2 * | 10/2020 | Lovasz | E05B 83/00 |
| 2006/0033344 | A1 * | 2/2006 | Blake, III | B29C 45/16 292/173 |
| 2015/0042107 | A1 * | 2/2015 | Glickman | E05C 1/10 292/138 |
| 2017/0058580 | A1 * | 3/2017 | Marsden | E05B 65/0014 |
| 2021/0170848 | A1 * | 6/2021 | Willard | B60J 7/194 |

FOREIGN PATENT DOCUMENTS

| DE | 19736508 A1 * | 4/1999 | ............. B60J 7/194 |
|---|---|---|---|
| EP | 410683 A  * | 1/1991 | ............. B60J 7/185 |
| EP | 3034729 A1 * | 6/2016 | ............. E05C 17/36 |
| GB | 2407615 A  * | 5/2005 | ............. E05C 17/365 |

\* cited by examiner

*Primary Examiner* — Kristina R Fulton
*Assistant Examiner* — James Edward Ignaczewski
(74) *Attorney, Agent, or Firm* — Grogan, Tuccillo & Vanderleeden, LLP

(57) ABSTRACT

A quick release system for a vehicle cover includes a housing and a locking member received within the housing, the locking member including a keyhole opening and a biasing mechanism. The biasing mechanism biases the locking member to a first, locked position within the housing whereby a locking pin received though the keyhole opening cannot be removed via an axial force exerted on the locking pin. The locking member is movable against the bias of the biasing mechanism to a second, clearance position whereby the locking pin can be withdrawn from the locking member.

16 Claims, 17 Drawing Sheets

QUICK RELEASE SYSTEM FOR A VEHICLE HARD TOP

CROSS-REFERENCE TO RELATED APPLICATIONS

This application claims priority to U.S. Provisional Patent Application Ser. No. 62/783,359, filed on Dec. 21, 2018, which is hereby incorporated by reference herein in its entirety.

FIELD OF THE INVENTION

The present invention relates generally to vehicles having removable hard tops and, more particularly, to a system and method for quickly and easily removing a hard top from, or securing a hart top to, the body of a vehicle.

BACKGROUND OF THE INVENTION

A number of known vehicles, including passenger automobiles, are manufactured with hard tops or caps that are configured for removable attachment to the body of the vehicle. For example, Jeep's Wrangler model passenger vehicles are manufactured with hard tops that can be selectively removed so that a soft-top can be installed or the vehicle driven without a top. In addition, various automotive companies and aftermarket manufacturers offer camper canopies (also referred to as canopies or caps) that are designed to be secured to the body of the pickup truck over the rear bed of the truck. Typically, these hard tops or caps are manufactured from a rigid material such as fiberglass or aluminum.

Hard tops or caps are typically secured to the body of the vehicle at a number of hold down points using an array of threaded fasteners. For example, Jeep hard tops are secured to the body of the vehicle using a plurality Torx head screws (e.g. T-40 Torx head screws). Pickup truck caps or canopies are secured in a substantially similar manner.

While the systems and methods currently employed to secure and remove hard tops and caps from a vehicle are generally suited to what is regarded as ordinary performance, there are some drawbacks. For example, it is time consuming and laborious to remove or re-install a jeep hard top or pickup truck cap with current methods. In the case of a Jeep hard top, a T-40 bit and socket wrench is needed to manually loosen (or tighten, as the case may be) each of the four (or six in the case of newer model four-door Jeep Wrangler vehicles) Torx head screws to decouple or couple the hard top to/from the vehicle body. In certain cases, these screws may not loosen or install easily, can bind up, and may be prone to cross-threading. In any event, it is very time consuming to rotate each hold down screw.

Recent efforts to provide a quicker and easier way to remove or install hard tops or caps have focused on different types of screw fasteners. For example, there exists various aftermarket T-knob or winged-head screw fasteners that are designed to replace the OEM hold down screws. These fasteners can be removed and installed by hand by grasping the head of the fasteners and rotating them, i.e., without needing a socket wrench and Torx bit. Notably, however, installing and removing hard tops and caps is still a time consuming and laborious process, as many turns of manual rotation are still necessary to remove or install each screw.

In view of the above, there is a need for a system and method for quickly and easily removing or installing hard tops or caps for vehicles that obviates the drawbacks associated with existing screw-type hold down fasteners.

SUMMARY OF THE INVENTION

It is an object of the present invention to provide a system for removing and securing hard tops, caps or canopies to a vehicle.

It is an object of the present invention to provide a system for removing and securing hard tops, caps or canopies to a vehicle quickly and easily.

It is an object of the present invention to provide a system for removing and securing hard tops, caps or canopies to a vehicle that can be easily retrofit onto existing vehicles.

It is another object of the preset invention to provide a method of removing and securing hard tops, caps or canopies to a vehicle.

These and other objects are achieved by the present invention.

According to an embodiment of the present invention, a quick release system for a vehicle cover includes a housing and a locking member received within the housing, the locking member including a keyhole opening and a biasing mechanism. The biasing mechanism biases the locking member to a first, locked position within the housing whereby a locking pin received though the keyhole opening cannot be removed via an axial force exerted on the locking pin. The locking member is movable against the bias of the biasing mechanism to a second, clearance position whereby the locking pin can be withdrawn from the locking member.

According to another embodiment of the present invention, a method for removing a cover from a vehicle body includes urging a locking member linearly to position a first opening of the locking member into alignment with an axis of a locking pin, and exerting an axial pulling force on a locking pin received through the locking member to withdraw the locking pin from the locking member through the first opening, and through corresponding apertures in a vehicle body and a vehicle cover at a hold down point.

According to yet another embodiment of the present invention, a quick release system for a vehicle cover includes a housing, a locking member received within the housing, the locking member including a keyhole opening and a biasing mechanism, and a locking pin receivable through the keyhole opening and having an axis. The keyhole opening includes a first opening having a first diameter and a second opening in communication with the first opening and having a second diameter, wherein the second diameter is smaller than the first diameter. The biasing mechanism biases the locking member to a first, locked position within the housing whereby the axis of the locking pin is generally aligned with a center of the second opening. The locking member is movable against the bias of the biasing mechanism to a second, clearance position whereby the axis of the locking pin is generally aligned with a center of the first opening.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
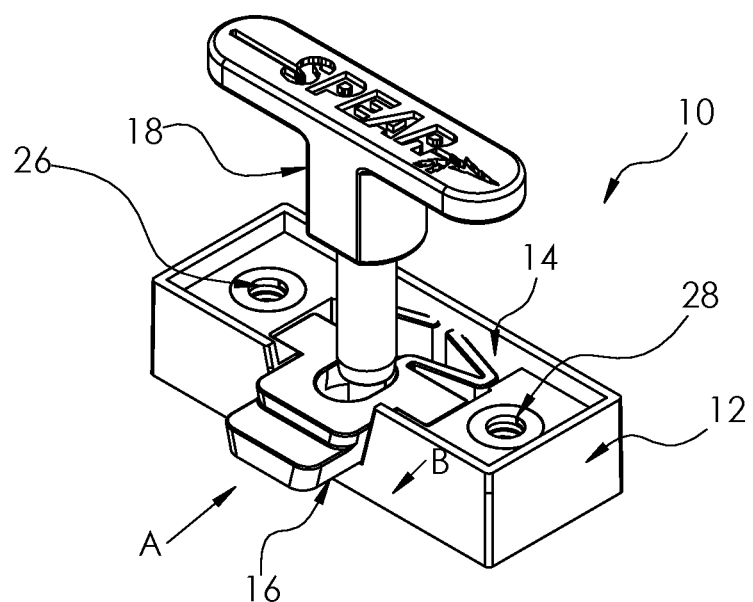
FIG. 1 is a perspective view of a quick release system 10 for removing and/or securing a hard top to a vehicle, according to an embodiment of the present invention.
Figure 2:
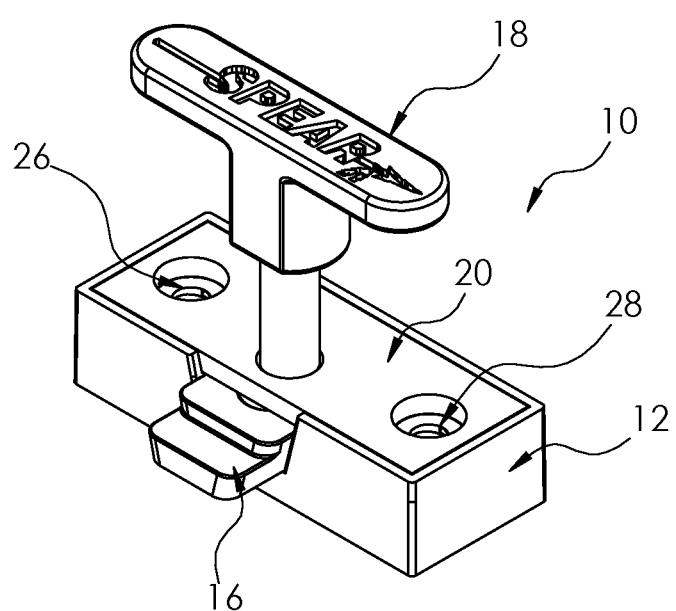
FIG. 2 is a perspective view of the quick release system 10 of FIG. 1, illustrating a cover therefor.
Figure 3:
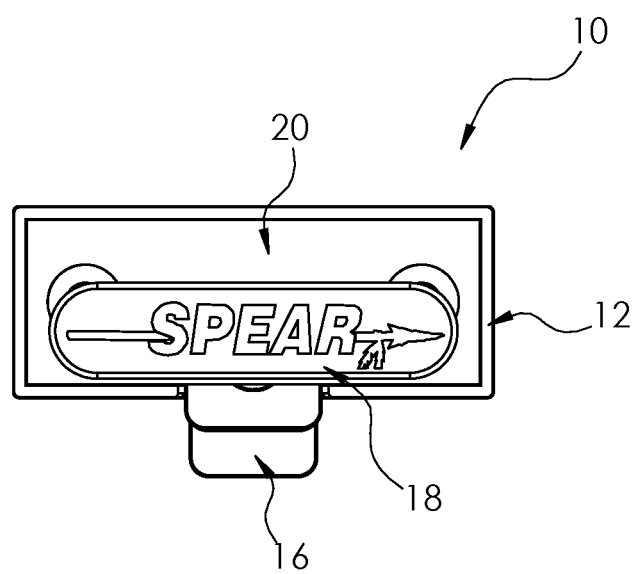
FIG. 3 is a top plan view of the quick release system of FIG. 1.
Figure 4:
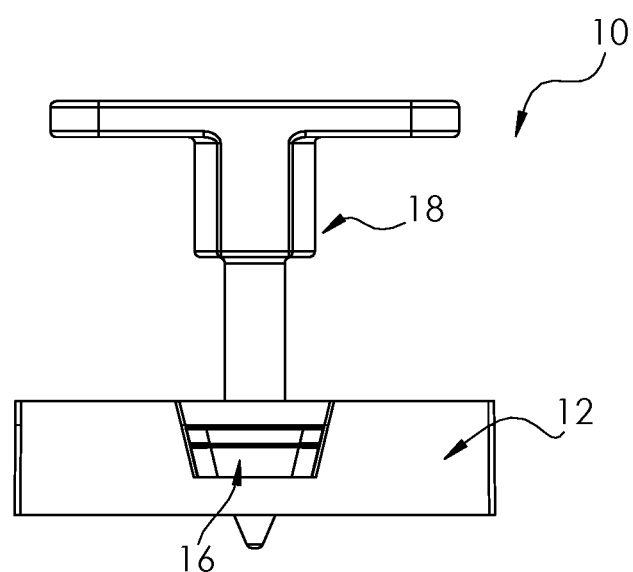
FIG. 4 is a front elevational view of the quick release system of FIG. 1.

Referring to FIGS. 1-4, a quick release system 10 for removing and/or securing a hard top, cap or cover to a body of a vehicle is shown. The system 10 includes a mounting bracket 12 having a recess or recessed area 14, a locking member 16 received in the recess 14, and a quick release locking pin 18 receivable by the locking member 16. With reference to FIG. 2, in an embodiment, the system 10 may include a cover member 20 that substantially encloses the recess 14 to maintain the locking member 16 within the recess 14, as discussed hereinafter.

Figure 5:
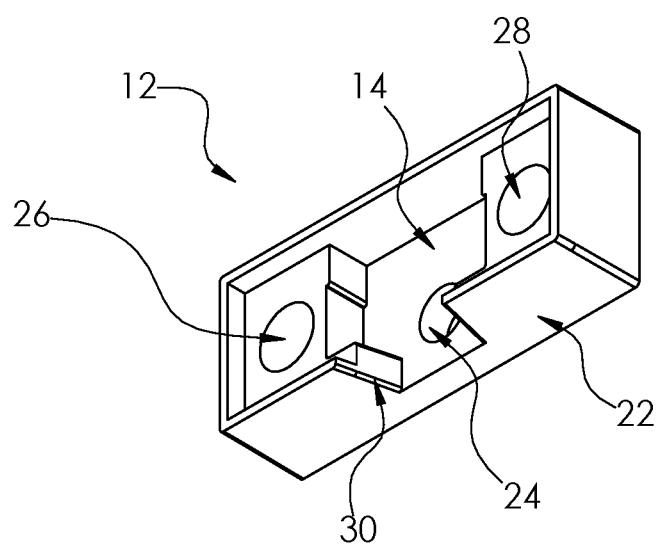
FIG. 5 is a perspective view of a mounting bracket of the quick release system of FIG. 1.
Figure 6:
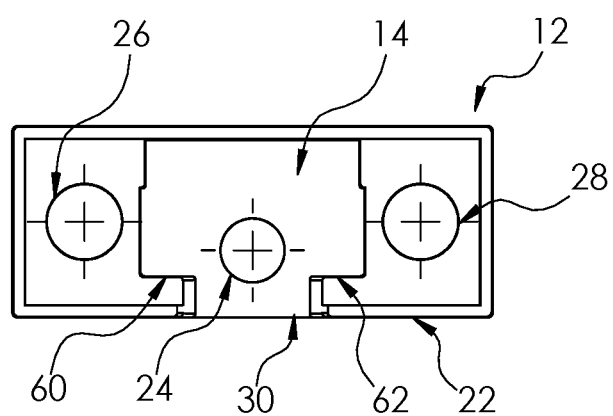
FIG. 6 is a top plan view of the mounting bracket of FIG. 5.
Figure 7:
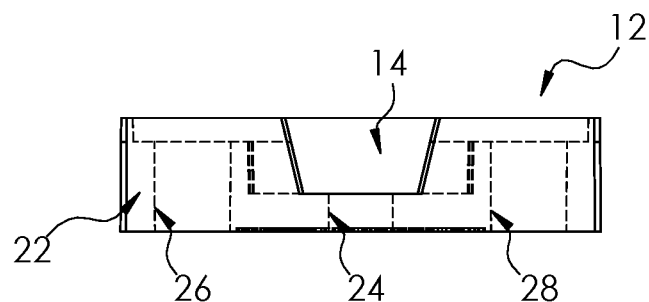
FIG. 7 is a front elevational view of the mounting bracket of FIG. 5, showing the internal structures in dashed lines.

With reference to FIGS. 5-7, more detailed views of the mounting bracket 12 are shown. The mounting bracket 12 has a plurality of sidewalls, a bottom, and a generally open top and generally defines a housing for receiving the locking member 16. As illustrated in FIGS. 5-7, the mounting bracket 12 may be generally rectangular in shape, although other shapes are possible without departing from the broader aspects of the invention. As indicated above, the mounting bracket includes a recessed area 14 that accommodates the locking member 16. Importantly, the front sidewall 22 has a clearance opening 30 in communication with the recess, the purpose of which will be hereinafter described.

As best shown in FIGS. 5 and 6, the mounting bracket 12 includes a central aperture 24 that extends through the bottom of the mounting bracket 12 and is in communication with the recess 14. The mounting bracket 12 further includes a pair of threaded recesses or throughbores 26, 28 on opposing sides of the central aperture 24. The threaded bores 28, 28 are configured to threadedly receive threaded fasteners (e.g., bolts) for mounting the mounting bracket to the body of a vehicle, as described hereinafter. In one embodiment, the mounting bracket 12 is approximately 2.5 inches long, approximately 1 inch wide, and approximately 0.59 inches thick.

Figure 8:
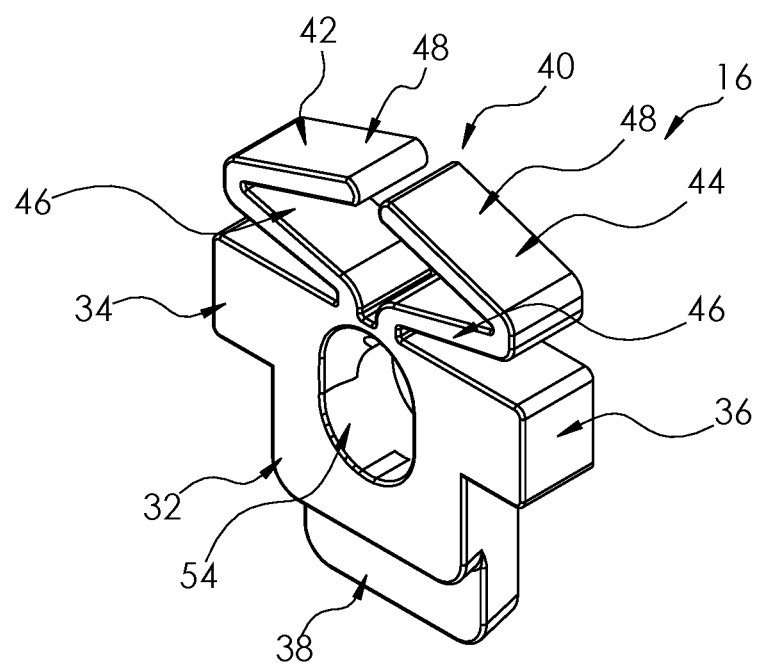
FIG. 8 is a perspective view of a locking member of the of the quick release system of FIG. 1.
Figure 9:
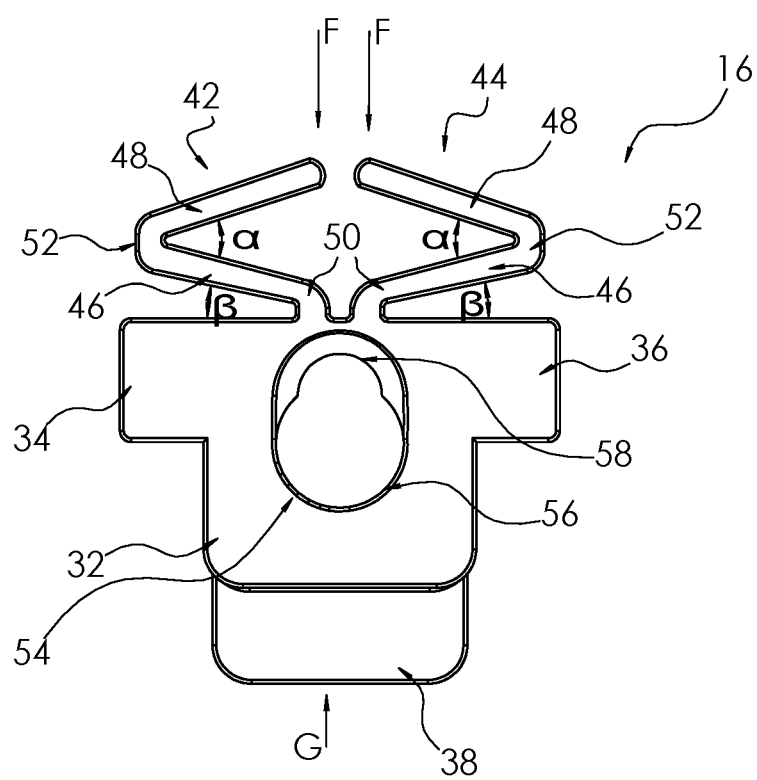
FIG. 9 is a top plan view of the locking member of FIG. 8.
Figure 10:
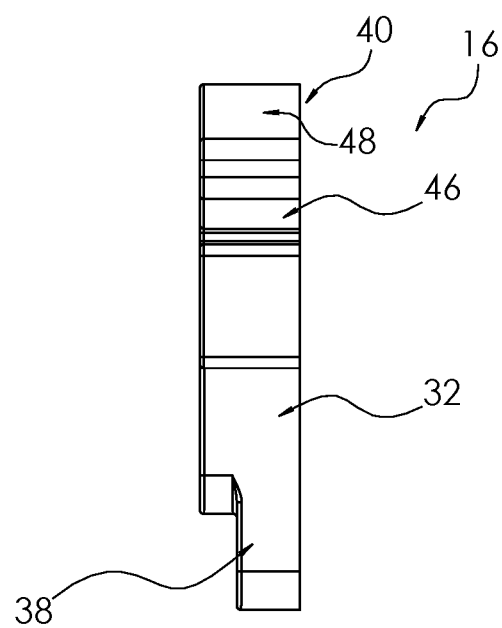
FIG. 10 is a side elevational view of the locking member of FIG. 8.

Turning now to FIGS. 8-10, various views of the locking member 16 are shown. The locking member 16 generally corresponds in shape to the recess 14 in the mounting bracket 12, and includes a body portion 32 having a pair of arms 34, 36 extending laterally outwardly and generally perpendicularly from the body portion 32, a thumb engagement portion or thumb actuator 38 extending from the body portion 32, and a biasing mechanism 40 extending from the body portion 32 opposite from the thumb engagement portion 38. The biasing mechanism 40, as shown in FIGS. 8-10 includes a pair of generally V-shaped arms 42, 44 (each having a first leg member 46 that extends at an outwardly extending, upward angle from the body portion 32, and a second leg member 48 that is generally turned back upon the first leg member 46 (i.e., inward facing) and continues at an upward angle, such that the first leg 46 member and the second leg member 48 form an acute angle therebetween). The arms 43, 44 are preferably integrally formed with the body portion 32, such that the joint between the first leg members 46 and the body portion 32 form a living hinge. Likewise, the first leg member 46 and second leg member 48 of each arm are integrally formed with one another such that the vertex or connection point between the two leg members likewise forms a living hinge.

With reference to FIG. 9, importantly, the arms 42, 44 are resilient such that when a force, F, is applied to a distal end of each arm 42, 44, the first leg 46 and the second leg 48 bend about the respective living hinges 50, 52. In particular, as force, F, is applied to the distal ends of each arm 42, 44, the leg member 46, 48 bend about their hinges 50, 52 such that the angle, α, formed between the body portion 32 and the first leg 46, and the angle, β, formed between the first leg 46 and the second leg 48 of each arm 42, 44 decreases. As discussed in detail hereinafter, the biasing mechanism 40 therefore allows the locking member 16 to be urged rearwardly within the mounting bracket 12 against the bias of the biasing mechanism 40 when a force in the direction of arrow G is applied to the thumb engagement portion 38.

With continued reference to FIG. 9, the locking member 16 also includes a keyhole opening 54 that extends through the body portion 32 of the locking member 16. The keyhole opening 54 includes a first, substantially round opening 56 having a first diameter, and a slot or second opening 58 overlapping and/or extending up from the first opening 56 and having a second diameter that is smaller than the first diameter. The keyhole opening 54 is configured to receive a locking pin therethrough for selective locking, as discussed below.

Referring back to FIGS. 1 and 6, the locking member 16 is received within the recess 14 in the mounting bracket such that the opposing arms 34, 36 of the locking member 16 abut shoulders 60, 62 of the mounting bracket 12 that bound the recess 14. As best shown in FIG. 1, when received in the recess 14, a portion of the locking member 16, including at least the thumb engagement member 38, protrudes through the clearance opening 30 in the front sidewall 22 of the mounting bracket 12. This configuration is also illustrated in FIG. 2. As further shown in FIG. 2, the locking member 16 is retained within the mounting bracket 12 via the shoulders 60, 62, and the cover member 20.

Figure 11:
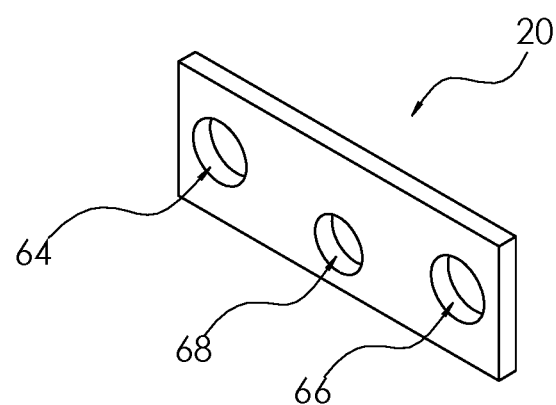
FIG. 11 is a perspective view of a cover member of the quick release system of FIG. 1.

As shown in FIG. 11, the cover member 20 is dimensioned to fit within the top opening of the mounting bracket 16 and includes apertures 64, 66 that are configured to be aligned with threaded recesses 26, 28, and a central aperture 68 that is configured for alignment with the keyhole opening 54 of the locking member 16 (and, in particular, a center of the second opening 58 of the keyhole opening 54) and the central aperture 24 in the mounting bracket 12.

Figure 12:
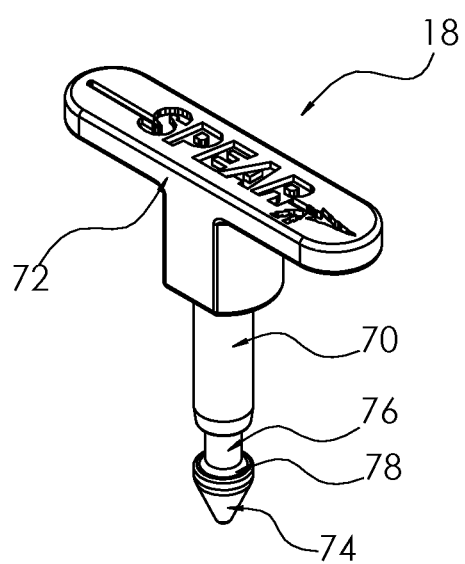
FIG. 12 is a perspective view of a locking pin of the quick release system of FIG. 1.
Figure 13:
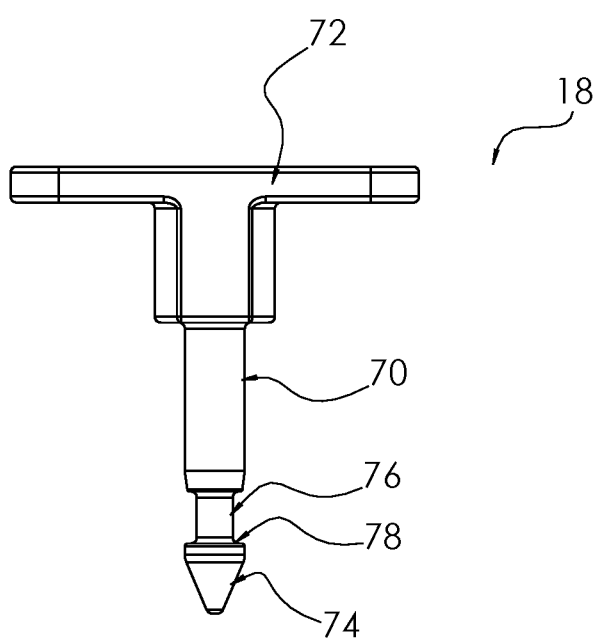
FIG. 13 is a front elevational view of the locking pin of FIG. 12.
Figure 14:
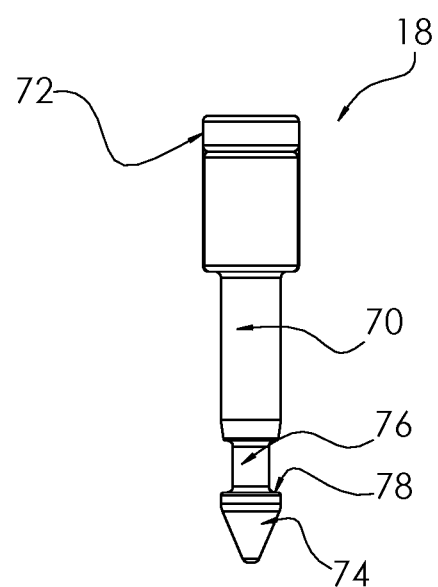
FIG. 14 is a side elevational view of the locking pin of FIG. 12.

With reference to FIGS. 12-14, the quick release locking pin 18 is best shown. The locking pin 18 includes a shaft 70 having a proximal end and a distal end, and a generally T-shaped handle 72 attached to, or integrally formed with the shaft 70 its proximal end. The shaft 70 includes a conical or pointed distal end 74 and a clearance portion 76 intermediate the distal end 74 and the main portion of the shaft 70. The clearance portion 76 has a reduced diameter relative to main portion of the shaft 70 lying above it, and an upper portion of the distal end 74 lying immediately below it. As shown in FIGS. 12-14, the clearance portion 76 and distal end 74 therefore form an upwardly facing annular shoulder 78.

In an embodiment, the diameter of the annular shoulder 78 of the distal end 74 of the locking pin 18 is less than the respective diameters of the central aperture 68 of the cover member 20, the first opening 56 of the locking member 16, and the central opening 24 in the bottom of the mounting bracket 12. This permits the distal end of 74 of the locking pin 18 to pass through these openings. The diameter of the clearance portion 76 is smaller than the diameter of the second opening 58 in the locking member, allowing the clearance portion 76 or be received in the second opening 58, as discussed hereinafter. Importantly, the diameter of the annular shoulder 78 of the distal end 74 of the locking pin 18, is greater than the diameter of the second opening 58.

Figure 15:
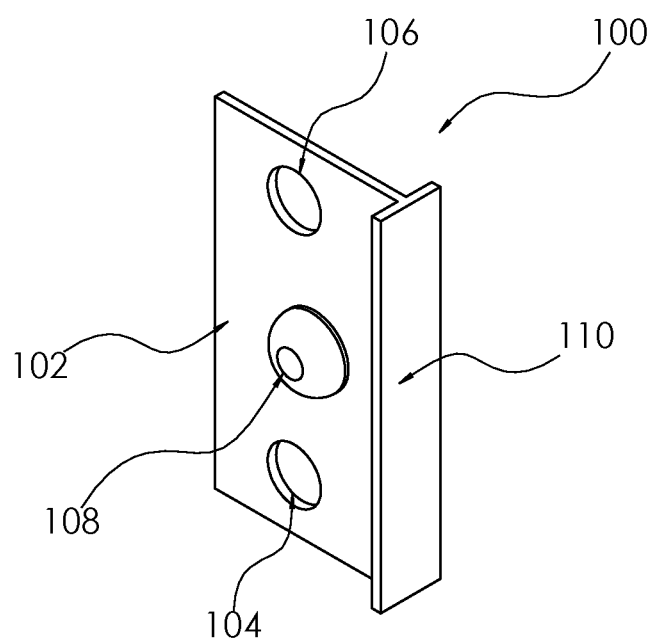
FIG. 15 is a perspective view of a mounting template, for use in mounting the quick release system of FIG. 1.
Figure 16:
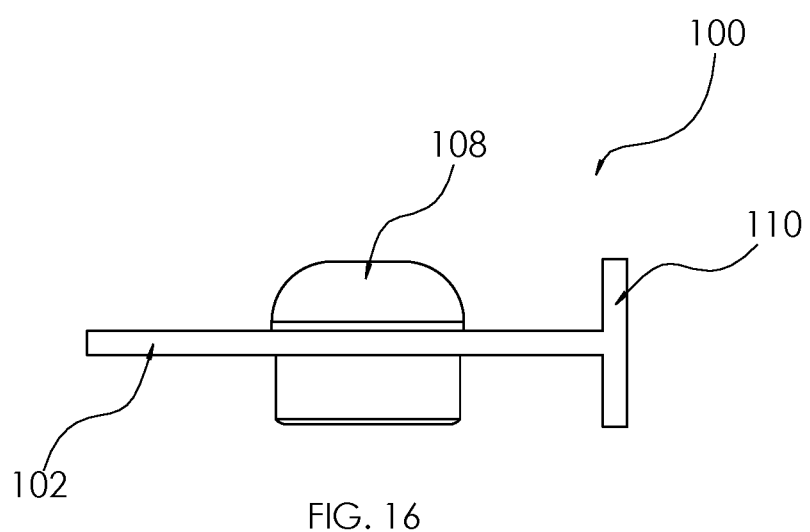
FIG. 16 is a side elevational view of the mounting template of FIG. 15.

In use, to attach or retrofit the system 10 of the present invention onto existing vehicles to secure a hard top or cap to a vehicle or pickup truck bed, any existing hard top or cap is removed by unscrewing the screws at the hold down points. Once the top and hardware is removed, the mounting bracket 12 (with the locking member 16 and any cover member 20 in place) is secured to the body of the vehicle beneath the existing body flange of the vehicle using bolts. With reference to FIGS. 15 and 16, a mounting template 100 may be utilized to mark the proper positions of pilot holes for the threaded fasteners (not shown) that are used to secure the mounting bracket 12 to the body flange of the vehicle.

As illustrated in FIGS. 15 and 16, the template 100 may include a body 102 having a pair of apertures that are spaced apart a distance equivalent to the distance between the threaded recesses 26, 28 in the mounting bracket 12. The template 100 also includes a locating projection 108 that is configured to be received in the existing apertures in the body flange of the vehicle. Further, the template 100 may include a position stop 110 that extends perpendicularly from an edge of the body 102. The position stop 110 is configured to abut the edge of the body flange. Accordingly, the position stop 110 and/or the locating projection cooperate to properly indicate the position of pilot holes to be drilled in the body flange of the vehicle adjacent to the existing mounting aperture in the body flange of the vehicle.

Figure 17:
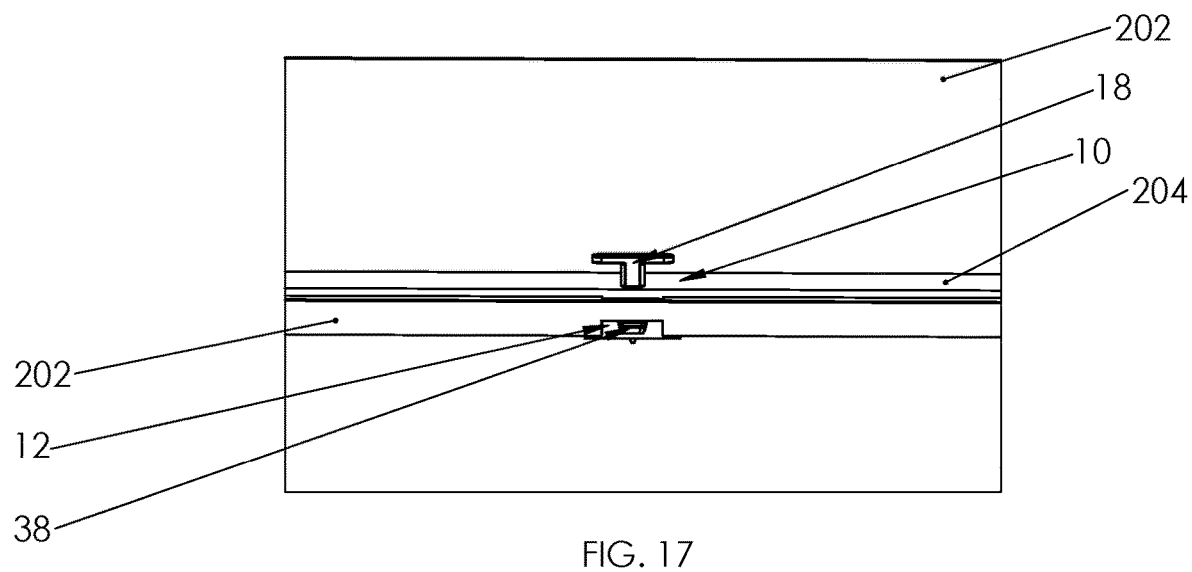
FIG. 17 is a detailed, perspective view of the quick release system of FIG. 1, shown coupling a hard top to a vehicle body.

Once the proper position of the pilot holes is determined and marked, the pilot holes are drilled in the body flange of the vehicle. The mounting bracket 12 is then placed beneath the body flange and threaded fasteners (not shown) are passed through the pilot holes and cooperate with the threaded recesses 26, 28 in the mounting bracket 12 to secure the mounting bracket to the underside of the body flange. FIG. 17 illustrates the mounting bracket 12 secured to the underside of a body flange 200 of a vehicle. In proper position, the existing aperture in the body flange of the vehicle is aligned with the central aperture 68 in the cover member 20 (if any), and the central aperture 24 in the mounting bracket 12, and is in general alignment with the keyhole opening 58 in the locking member 16. In particular, the biasing mechanism 40 of the locking member 16 acts upon the rear wall of the mounting bracket 12 to bias the mounting bracket 16 away from the rear wall (and when in such biased position, the second opening 58 of the keyhole opening 54 is aligned with the central aperture 68 in the cover 20 and central aperture in the mounting bracket 12.

After the mounting bracket 12 is secured to the underside of the body flange 200, the hard top or cap (e.g., hard top 202) is placed atop the vehicle body so that the aperture in a cooperating flange 204 of the hard top 202 is aligned with the aperture in the body flange 200. The locking pin 18 is then inserted through the aperture in the cooperating flange 204 of the hard top 202, and through the central aperture 68 in cover member 20 until the distal tip 74 of the locking pin 18 is received by the small, second opening 58 of the keyhole opening 54 of the locking member 16. Because the diameter of the second opening 58 is less than the diameter of the upper part (i.e., the annular flange 78) of the distal tip 74, however, the locking pin 18 does not pass unobstructed through the keyhole opening 54. Continued downward, axial urging of the locking pin 18, however, will cause the locking member 18 to move rearwardly, in the direction of arrow A in FIG. 1. This is due to the sloped, conical surface of the distal tip 74 transmitting a rearward force against the bias of the biasing mechanism 40. As the body 32 of the locking member 16 moves rearwardly, the larger, first opening 56 of the keyhole opening 54 moves into alignment with the distal tip 74 of the locking pin 18, allowing the distal tip 74 to pass therethrough (and thereafter through the central opening 24 of the mounting bracket 12 and aperture in the body flange 200 of the vehicle.

As the distal tip 72 of the locking pin 18 passes through the larger, first opening 56 of the keyhole opening (and the shoulder 78 clears the bottom surface of the body portion 32 of the locking member 16), the reduced diameter clearance portion 76 of the locking pin 18 is received in the first opening 56. At this point, as the enlarged part of the distal tip 74 no longer contacts the periphery of the keyhole opening 54, the bias of the biasing mechanism 40 moves the body 32 of the mounting bracket 16 forwardly, in the direction of arrow B in FIG. 1, causing the reduced diameter clearance portion 76 to now be received in the smaller diameter second opening 58 of the keyhole opening 54. In this position, the hard top 202 is locked to the body flange 200 of the vehicle by the system 200. In particular, because the axis of the locking pin 18 is aligned with the smaller, second opening 58 of the keyhole opening 54, any attempt to remove the locking pin 18 by pulling upwardly on the handle 72 will cause the flange 78 of the locking pin to abut the underside of the locking member 16, as the larger diameter flange 78 cannot pass through the smaller diameter second opening 58 of the keyhole opening 56.

Figure 18:
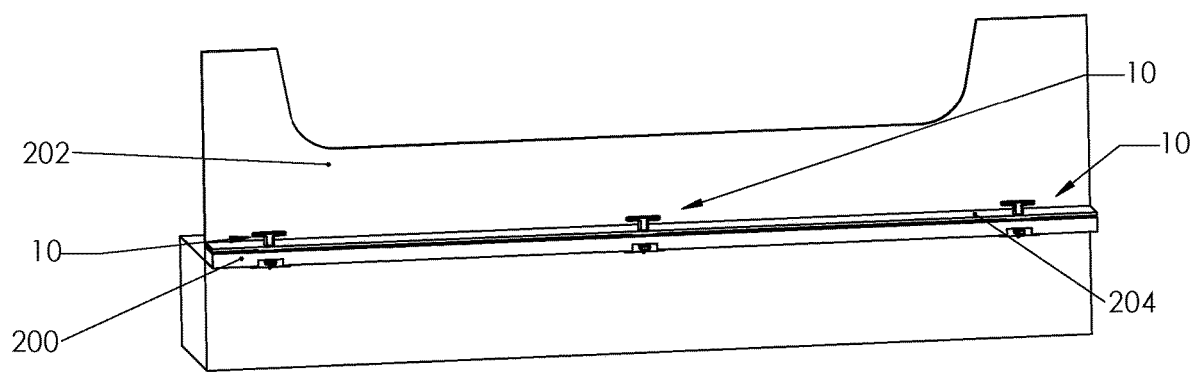
FIG. 18 is a perspective view of multiple quick release systems shown in use for coupling a hard top to a vehicle body.

The process described above is repeated for each hold down point for the hard top/cap until the hard top/cap is fully secured to the vehicle body, as illustrated in FIG. 18. Accordingly, for each hold down point, a user need only push the locking pin 18 downwardly into the mounting bracket 12 to secure the hard top in place.

As alluded to above, the system 10 of the present invention also allows for the easy and quick removal of the hard top 202 from the vehicle body. In particular, when it is desired to remove the hard top 202, a user must simply push on the thumb actuator 38 and withdraw the locking pin 18. In particular, inward urging of the thumb actuator 38 against the bias of the biasing mechanism 40 causes the body 32 of the locking member 16 to move inwardly (again, in the direction of arrow A in FIG. 1). This inward movement causes the larger, first opening 56 of the keyhole opening 54 to move into alignment with the axis of the locking pin 18, allowing the locking pin 18 and the enlarged, distal tip 74 thereof to be withdrawn from the mounting bracket 12 through simply upward pulling on the handle 72. In this respect, to decouple the hard top 202 from the vehicle body, a user simply must press the thumb actuator 38 of the locking member 16 inwardly, and pull upwardly on the locking pin 18. This is in stark contrast to existing system, which require tools and multiple rotations of threaded fasteners to decouple the hard top at each hold down point.

The present invention therefore provides for a quick release system for removing and/or securing a hard top to a vehicle. The system 10 is mounted to a vehicle body via two screws or threaded fasteners. The system 10 includes a spring-loaded thumb actuator 38 that locks the locking pin 18 in place when inserted into the mounting bracket 12. When it is desired to remove the hard top, a user must simply push the thumb actuator 38 and pull the locking pin 18.

While the biasing mechanism 40 has been described herein as taking the form of a pair of resilient arms, different mechanisms may be employed without departing from the broader aspects of the invention. For example, coil springs and similar devices may be utilized to bias the body 32 of the locking member 16. It is contemplated that the various components of the system 10 described herein may be manufactured from metals or polymers, through molding, machining or other processes. In an embodiment, the locking pin 18 is formed from metal, while the other components of the system, including the mounting bracket 12 and locking member 16 may be formed from plastics or polymers.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A quick release system for a vehicle cover, comprising:
a housing; and
a locking member received within the housing, the locking member including a keyhole opening and a biasing mechanism;
wherein the biasing mechanism biases the locking member to a first, locked position within the housing whereby a locking pin received though the keyhole opening cannot be removed via an axial force exerted on the locking pin;
wherein the locking member includes an engagement portion that extends from the housing and is accessible to a user to move the locking member against the bias of the biasing mechanism from the first, locked position, to a second, clearance position whereby the locking pin can be withdrawn from the locking member;
wherein the biasing mechanism includes a first resilient arm extending from a body of the locking member and a second resilient arm extending from the body of the locking member; and
wherein each of the first resilient arm and the second resilient arm is generally V-shaped and includes a first leg member and a second leg member forming a joint therebetween, the first leg member being linear and having a first end connected to the body of the locking member and a second end connected to the second leg member at the joint, the second leg member being linear and having a first end connected to the first leg member at the joint and a second end configured to bear against a rear wall of the housing, each of the first resilient arm and the second resilient arm further including at least one living hinge formed at the joint between the first leg member and the second leg member;
wherein the first resilient arm and the second resilient arm form a diamond shape therebetween; and
wherein the second end of the second leg member of each of the first resilient arm and the second resilient arm form a distal-most portion of the locking member opposite the engagement portion.

2. The quick release system of claim 1, wherein:
the keyhole opening includes a first opening having a first diameter and a second opening in communication with the first opening and having a second diameter;
wherein the second diameter is smaller than the first diameter;
wherein when in the first, locked position, a center of the second opening of the keyhole opening is aligned with an axis of the locking pin; and
wherein when in the second, clearance position, a center of the first opening of the keyhole opening is aligned with the axis of the locking pin.

3. The quick release system of claim 2, further comprising:
the locking pin;
wherein the locking pin includes a shaft having an enlarged, distal tip defining an annular flange, and a clearance portion adjacent to the annular flange;
wherein the annular flange has a diameter that is greater than a diameter of the clearance portion.

4. The quick release system of claim 3, wherein:
the diameter of the annular flange is greater than the second diameter of the second opening.

5. The quick release system of claim 3, wherein:
the locking pin includes a generally T-shaped handle.

6. The quick release system of claim 1, wherein:
the housing includes at least two threaded recesses for receiving corresponding threaded fasteners for securing the housing to a flange of a vehicle body.

7. A method for removing a cover from a vehicle body, comprising the steps of:
affixing a mounting bracket to an underside of a flange of a vehicle, the mounting bracket including a locking member;
urging the locking member linearly to position a first opening of the locking member into alignment with an axis of a locking pin; and
exerting an axial pulling force on a locking pin received through the locking member to withdraw the locking pin from the locking member through the first opening, and through corresponding apertures in a vehicle body and a vehicle cover at a hold down point;

wherein the locking member includes a biasing mechanism that biases the locking member to a first, locked position with respect to the mounting bracket whereby the locking pin received though the first opening cannot be removed via the axial pulling force exerted on the locking pin;

wherein the locking member includes an engagement portion accessible to a user and actuatable to move the locking member against the bias of the biasing member to position the first opening of the locking member into alignment with the axis of the locking pin;

wherein the biasing mechanism includes a first resilient arm extending from a body of the locking member and a second resilient arm extending from the body of the locking member; and wherein each of the first resilient arm and the second resilient arm is generally V-shaped and includes a first leg member and a second leg member forming a joint therebetween, the first leg member being linear and having a first end connected to the body of the locking member and a second end connected to the second leg member at the joint, the second leg member being linear and having a first end connected to the first leg member at the joint and a second end configured to bear against a rear wall of the mounting bracket, each of the first resilient arm and the second resilient arm further including at least one living hinge formed at the joint between the first leg member and the second leg member;

wherein the first resilient arm and the second resilient arm form a diamond shape therebetween; and wherein the second end of the second leg member of each of the first resilient arm and the second resilient arm form a distal-most portion of the locking member opposite the engagement portion.

8. The method according to claim 7, wherein:
urging the locking member linearly includes moving a second opening of the locking member out of alignment with the axis of the locking pin.

9. The method according to claim 8, wherein:
the locking pin includes a shaft having an enlarged, distal tip defining an annular flange, and a clearance portion adjacent to the annular flange;
wherein the annular flange has a diameter that is greater than a diameter of the clearance portion.

10. The method according to claim 9, wherein:
when the second opening of the locking member is in alignment with the axis of the locking pin, the locking pin cannot be axially withdrawn from the locking member.

11. The method according to claim 10, wherein:
a diameter of the annular flange is greater than a diameter of the second opening.

12. The method according to claim 7, further comprising the step of:
locking the cover to the vehicle body solely by axially inserting the locking pin through the corresponding apertures in the vehicle body and the vehicle cover at the hold down point, and through the first opening.

13. A quick release system for a vehicle cover, comprising:
a housing configured for mounting on an underside of a flange of a vehicle;
a locking member received within the housing, the locking member including a keyhole opening, and engagement portion, and a biasing mechanism;
a locking pin receivable through the keyhole opening and having an axis;
wherein the keyhole opening includes a first opening having a first diameter and a second opening in communication with the first opening and having a second diameter, wherein the second diameter is smaller than the first diameter;
wherein the biasing mechanism includes a first resilient arm extending from a body of the locking member and a second resilient arm extending from the body of the locking member; and
wherein each of the first resilient arm and the second resilient arm is generally V-shaped and includes a first leg member and a second leg member forming a joint therebetween, the first leg member being linear and having a first end connected to the body of the locking member and a second end connected to the second leg member at the joint, the second leg member being linear and having a first end connected to the first leg member at the joint and a second end configured to bear against a rear wall of the housing, each of the first resilient arm and the second resilient arm further including at least one living hinge formed at the joint between the first leg member and the second leg member;
wherein the first resilient arm and the second resilient arm form a diamond shape therebetween;
wherein the second end of the second leg member of each of the first resilient arm and the second resilient arm form a distal-most portion of the locking member opposite the engagement portion;
wherein the biasing mechanism biases the locking member to a first, locked position within the housing whereby the axis of the locking pin is generally aligned with a center of the second opening; and
wherein the engagement portion is accessible to a user to move the locking member against the bias of the biasing mechanism to a second, clearance position whereby the axis of the locking pin is generally aligned with a center of the first opening;
wherein the quick release system further includes a mounting template having a locating member receivable in an aperture in the flange, the mounting template facilitating proper positioning of the housing on the flange.

14. The quick release system of claim 13, wherein:
the locking pin has a head portion and a clearance portion, wherein the head portion has a largest diameter that is greater than a diameter of the clearance portion;
wherein the head portion can pass through the first opening of the locking member but not the second opening of the locking member.

15. The quick release system of claim 1, wherein a joint between the first leg member and the body forms a living joint.

16. The quick release system of claim 1, wherein:
the locking member moves relative the housing along an axis when a biasing force is exerted on the engagement portion, the axis extending through the keyhole opening and defining a line of symmetry of the keyhole opening; and
wherein the second end of each of the first resilient arm and the second resilient arm is located adjacent to the axis.

* * * * *